US006443036B1

(12) United States Patent
Martignon

(10) Patent No.: US 6,443,036 B1
(45) Date of Patent: Sep. 3, 2002

(54) MECHANICAL-HYDROSTATIC TRANSMISSION, PARTICULARLY FOR TOOLS AND VEHICLES SUITABLE FOR GARDENING, SUCH AS LAWN-MOWERS OR THE LIKE

(75) Inventor: Girolamo Martignon, Borgoricco (IT)

(73) Assignee: Antonio Carraro S.p.A., Campodarsego (IT)

( * ) Notice: Subject to any disclaimer, the term of this patent is extended or adjusted under 35 U.S.C. 154(b) by 0 days.

(21) Appl. No.: 09/613,617

(22) Filed: Jul. 11, 2000

(30) Foreign Application Priority Data

Jul. 15, 1999 (IT) ........................................ PD99A0165

(51) Int. Cl.⁷ .............................................. F16H 47/00
(52) U.S. Cl. ..................................................... 74/730.1
(58) Field of Search ........................... 74/606 R, 730.1, 74/731.1

(56) References Cited

U.S. PATENT DOCUMENTS

| | | | |
|---|---|---|---|
| 4,880,070 A | * | 11/1989 | Irikura ...................... 180/53.1 |
| 5,046,994 A | * | 9/1991 | Hasegawa et al. ............. 475/83 |
| 5,142,940 A | * | 9/1992 | Hasegawa ................. 74/606 R |
| RE34,833 E | * | 1/1995 | Hasegawa et al. ............. 475/83 |
| 5,542,307 A | * | 8/1996 | Hasegawa et al. ......... 74/15.63 |
| 5,544,547 A | | 8/1996 | Kanzaki |
| 5,560,447 A | | 10/1996 | Kanzaki |

FOREIGN PATENT DOCUMENTS

DE          11 71 276          5/1964

* cited by examiner

*Primary Examiner*—Dirk Wright
(74) *Attorney, Agent, or Firm*—Guido Modiano; Albert Josif; Daniel O'Byrne

(57) ABSTRACT

A mechanical-hydrostatic transmission particularly for tools and vehicles suitable for gardening, such as lawn-mowers or the like, comprising a reduction unit, a clutch unit, an oil pump and a hydraulic motor which are integrated and contained within a single casing, the pump and the clutch unit being arranged coaxially on a first shaft which is connected externally, by means of a coupling, to motor means, the pump being hydraulically connected to the hydraulic motor and the hydraulic motor being in turn axially associated with a second shaft from which a power take-off extends. The casing contains kinematic connections for transmitting motion to the driving wheels.

6 Claims, 3 Drawing Sheets

US 6,443,036 B1

MECHANICAL-HYDROSTATIC TRANSMISSION, PARTICULARLY FOR TOOLS AND VEHICLES SUITABLE FOR GARDENING, SUCH AS LAWN-MOWERS OR THE LIKE

BACKGROUND OF THE INVENTION

The present invention relates to a mechanical-hydrostatic transmission, particularly for tools and vehicles suitable for gardening, such as lawn-mowers or the like.

It is known that tools are currently used in the field of gardening or similar fields and are usually fitted on self-propelled vehicles, allowing the operator to perform various kinds of operation and work with limited effort and very rapidly.

The operating capabilities of these vehicles and of the tools installed thereon depend to a good extent on their mechanical structure, which as a whole must be compact, sturdy and adapted to ensure considerable flexibility in application, since the operating conditions can be the most disparate and demanding.

Such vehicles are usually provided with an engine which requires a mechanical transmission for moving the driving wheels.

Currently, notwithstanding the variety of commercially available types, mechanical transmissions for such vehicles comprise a reduction unit, a clutch unit arranged within a casing and, associated with said casing, auxiliary casings which accommodate an oil pump and a hydraulic motor which are adapted to operate in connection with said clutch unit.

Commercially available mechanical transmissions further require an additional reduction unit downstream of the reduction already provided by said transmission.

The above-described structure of mechanical transmissions is per se rather complicated and requires a considerable number of components which are not simple to manufacture and assemble.

Rather complicated hydraulic circuits are also required in order to coordinate the functions of the various units placed in separate casings.

SUMMARY OF THE INVENTION

The aim of the present invention is to provide a mechanical-hydrostatic transmission, particularly for tools and vehicles suitable for gardening, such as lawn-mowers or the like, which solves the above-noted drawbacks of conventional transmissions, particularly achieving considerable structural simplification, improving both the manufacture of the transmission and its sturdiness and operating functionality during use.

Within the scope of this aim, an object of the present invention is to provide a mechanical-hydrostatic transmission which allows a numerically large component reduction, with a consequent production cost reduction without however impairing operating functionality.

Another object of the present invention is to provide a mechanical-hydrostatic transmission which has a wide adjustment range and reduction variability and therefore does not require additional auxiliary reduction units arranged downstream of it.

Another object of the present invention is to provide a mechanical-hydrostatic transmission which requires a hydraulic circuit system which is simple and at the same time highly functional and safe, owing to the smaller number of components at risk of failure.

Another object of the present invention is to provide a mechanical-hydrostatic transmission which is functionally flexible with respect to the most disparate requirements of the application and of the vehicle on which it can be installed.

These and other objects which will become better apparent hereinafter are achieved by a mechanical-hydrostatic transmission, particularly for tools and vehicles suitable for gardening, such as lawn-mowers or the like, characterized in that it comprises a reduction unit, a clutch unit, an oil pump and a hydraulic motor which are integrated and contained within a single casing, said pump and said clutch unit being arranged coaxially on a first shaft which is connected externally, by means of a coupling, to motor means, said pump being hydraulically connected to said hydraulic motor and said hydraulic motor being in turn axially associated with a second shaft from which a power take-off extends, said casing containing kinematic connections for transmitting motion to the driving wheels.

BRIEF DESCRIPTION OF THE DRAWINGS

Further characteristics and advantages of the present invention will become better apparent from the following detailed description of an embodiment thereof, illustrated only by way of non-limitative example in the accompanying drawings, wherein.

DESCRIPTION OF THE PREFERRED EMBODIMENTS

Figure 1:
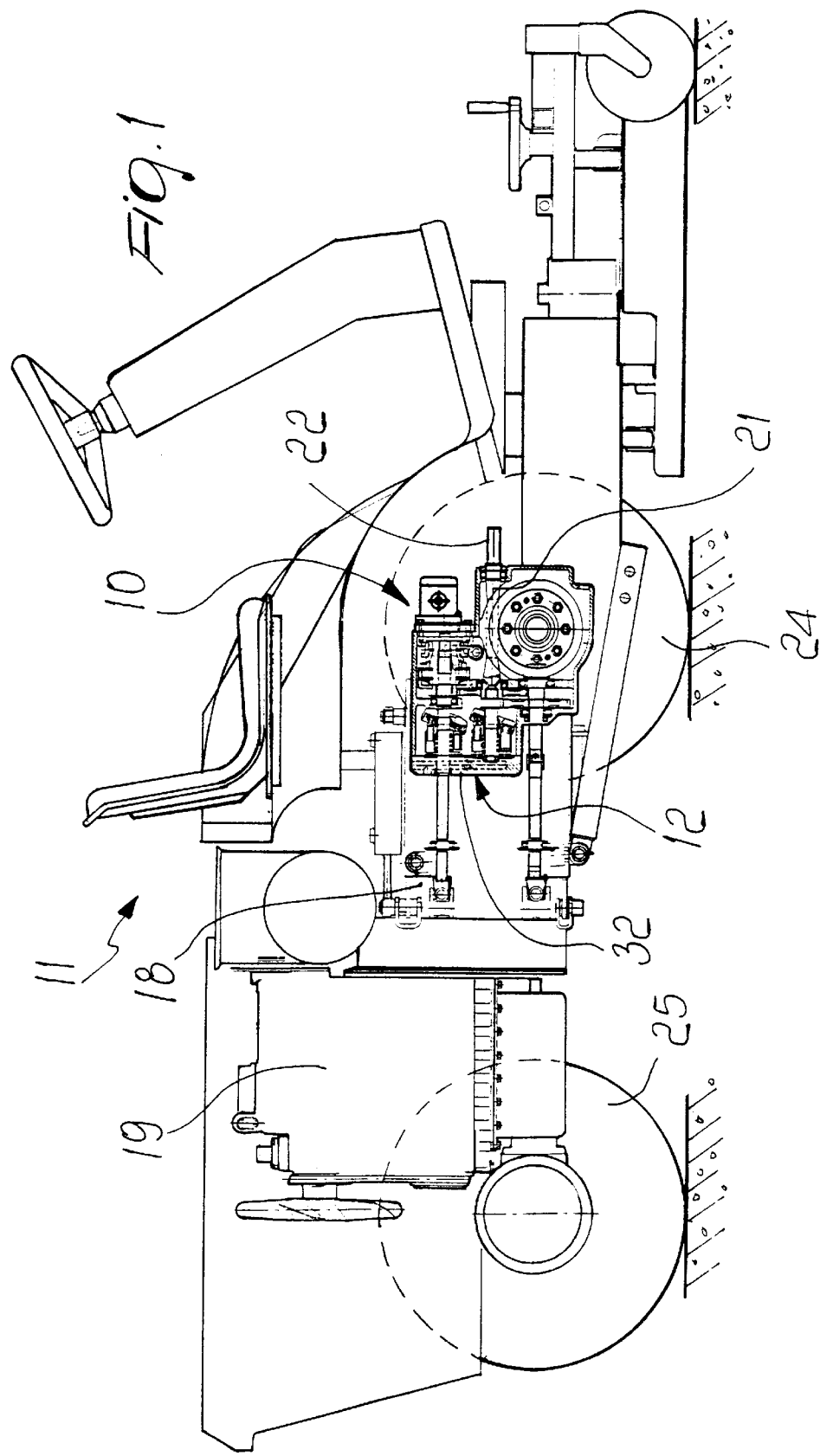
FIG. 1 is a side view of a mechanical-hydrostatic transmission according to the invention applied to a gardening vehicle.
Figure 2:
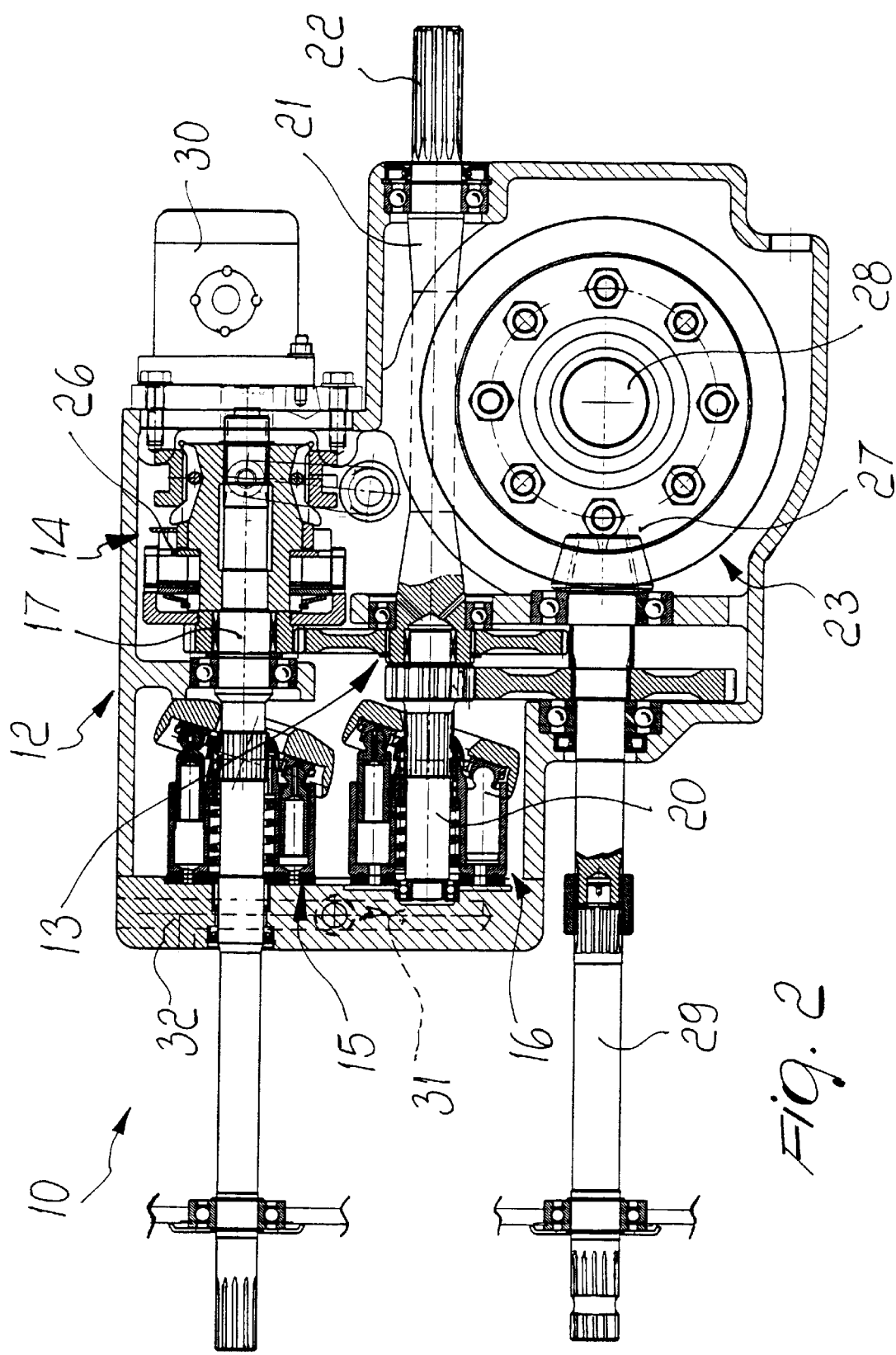
FIG. 2 is a partially sectional view of the transmission of FIG. 1.
Figure 3:
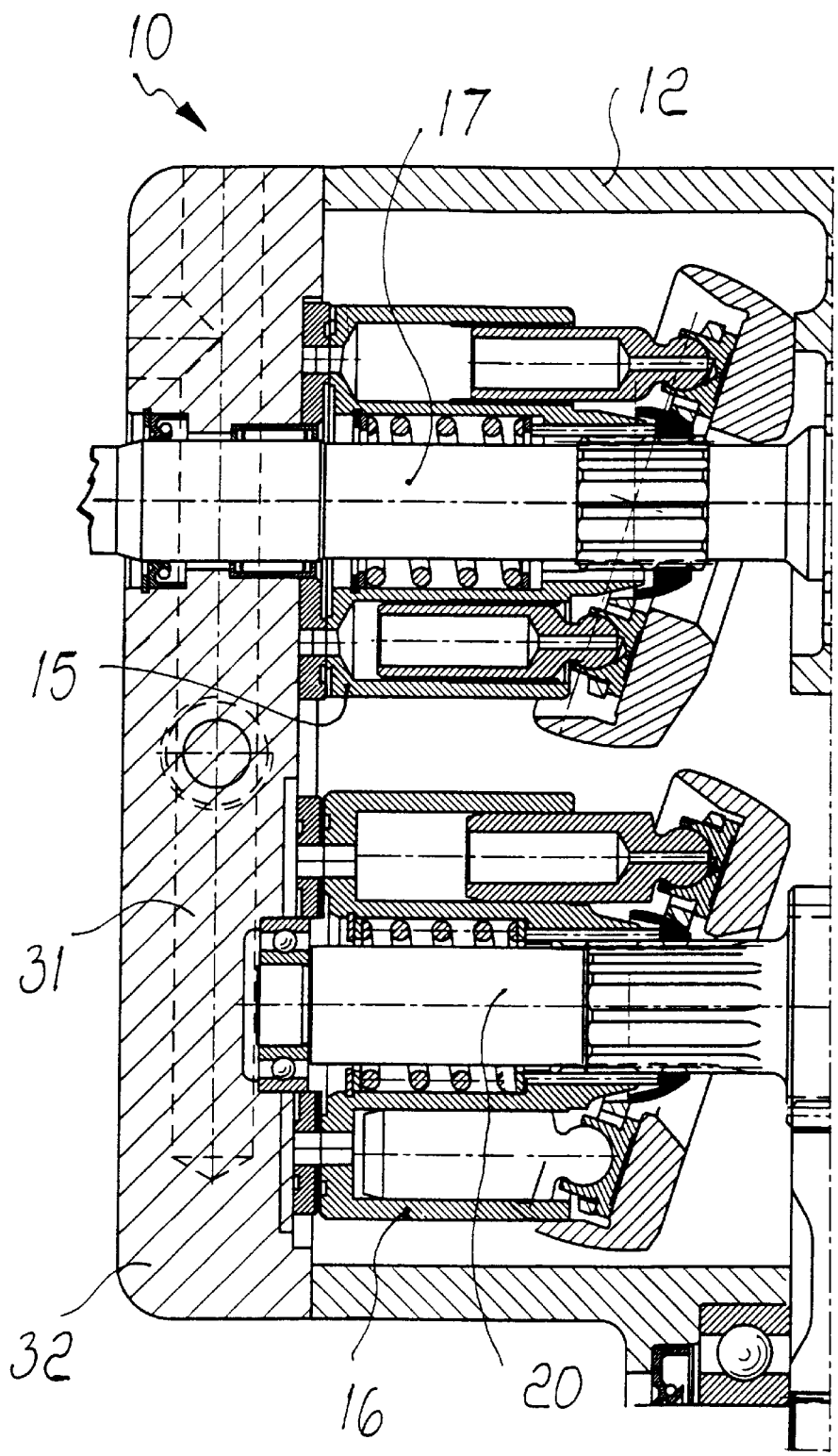
FIG. 3 is a sectional view of a detail of the transmission of FIG. 1.

With particular reference to FIGS. 1, 2 and 3, a mechanical-hydrostatic transmission, particularly for tools and vehicles suitable for gardening, such as lawn-mowers or the like, according to the invention, is generally designated by the reference numeral 10.

In particular, the transmission 10 is applied in this case to a compact tractor, generally designated by the reference numeral 11, which is outfitted as a lawn-mower.

The transmission 10 comprises a reduction unit 13, a clutch unit 14, an oil pump 15 and a hydraulic motor 16, which are integrated and contained within a single casing 12 with a cover 32.

The pump 15 and the clutch unit 14 are arranged coaxially on a first shaft 17 which is connected externally, by means of a coupling 18, to motor means generally designated by the reference numeral 19.

The pump 15 is hydraulically connected to the hydraulic motor 16 and the motor is axially associated with a second shaft 20 which is coaxially connected to a third shaft 21 which protrudes from the casing 12 so as to form a power take-off 22.

The casing 12 also contains kinematic connections, generally designated by the reference numeral 23, for the axles of the driving wheels, respectively designated by the reference numerals 24 and 25.

In particular, in this embodiment the oil pump 15 is of the variable-displacement type, and also the hydraulic motor 16 is of the variable-displacement type (and can also have a plurality of preset speed ranges).

Moreover, the clutch unit 14 is constituted by a disk clutch 26.

The kinematic connections 23 are constituted, in this case, by a bevel gear pair 27 for an axle 28 of the pair of front wheels 24 and by a fourth shaft 29 for axial connection of the rear wheels 25.

Moreover, the transmission 10 comprises an auxiliary pump 30 which is associated externally with respect to the casing 12, feeds the hydraulic steering system, the lifting of the tool, the auxiliary services and maintains the oil pressure on the pump 15 and the hydrostatic motor 16.

Ducts 31, shown in dashed lines in the figures, are also formed in the cover 32 and provide circuits and connections between the pump 15 and the motor 16.

In practice, it has been observed that the present invention has achieved its intended aim and objects.

In particular, it should be noted that the integration of the entire transmission within the same casing leads to a considerable simplification of the overall mechanical structure and of the oil circuit system, with a consequent reduction in production costs and a parallel increase in overall functionality and sturdiness.

The structure of the transmission according to the invention in fact has a smaller number of components at risk of failure with respect to commercially available transmissions.

It should also be noted that all the above, in terms of component reduction, has been achieved without reducing the functional capabilities of the transmission, which also allows, in use, considerable flexibility in terms of reduction and range of rotation rates.

This last characteristic allows to apply the transmission according to the invention without additional reduction units.

The present invention is susceptible of numerous modifications and variations, all of which are within the scope of the inventive concept.

The technical details can be replaced with other technically equivalent elements.

The materials and the dimensions may be any according to requirements.

The disclosures in Italian Patent Application No. PD99A000165 from which this application claims priority are incorporated herein by reference.

What is claimed is:

1. A mechanical-hydrostatic transmission, particularly for tools and vehicles suitable for gardening, such as lawn-mower, comprising
case means containing
first shaft means, said first shaft means being connected externally, by means of a coupling, to motor means,
an oil pump,
a clutch unit,
said oil pump and said clutch unit being arranged coaxially on said first shaft means,
a hydraulic motor of the variable displacement type, said hydraulic motor being hydraulically connected to said oil pump, kinematic connections for transmitting motion to the driving wheels, said kinematic connections being mechanically connected to said hydraulic motor,
said kinematic connections including
bevel gear pair means, said bevel gear pair means being arranged for driving a first pair of wheels,
second shaft means, said second shaft means connecting a second pair of wheels;
third shaft means,
a reduction unit, and
a power take-off,
said reduction unit being arranged for engagement with said clutch unit,
said reduction unit being mechanically connected to said second shaft means,
said power take-off extending from said third shaft means.

2. The transmission according to claim 1, wherein said oil pump is of the variable-displacement type.

3. The transmission according to claim 1, wherein said clutch unit is constituted by a disk clutch.

4. The transmission according to claim 1, wherein said third shaft means protrude from said case means so as to form said power take-off.

5. The transmission according to claim 1, further comprising an auxiliary pump, said auxiliary pump being arranged for feeding a hydraulic steering system, for lifting means arranged for lifting a tool, for controlling auxiliary services and for maintaining the pressure of the oil of said oil pump and of said hydraulic motor.

6. The transmission according to claim 1, wherein said case means further comprise a cover, said cover including one or more ducts for said hydraulic connection between said oil pump and said hydraulic motor.

* * * * *